(No Model.)
J. W. CARPENTER.
Gate.
No. 239,365.  Patented March 29, 1881.
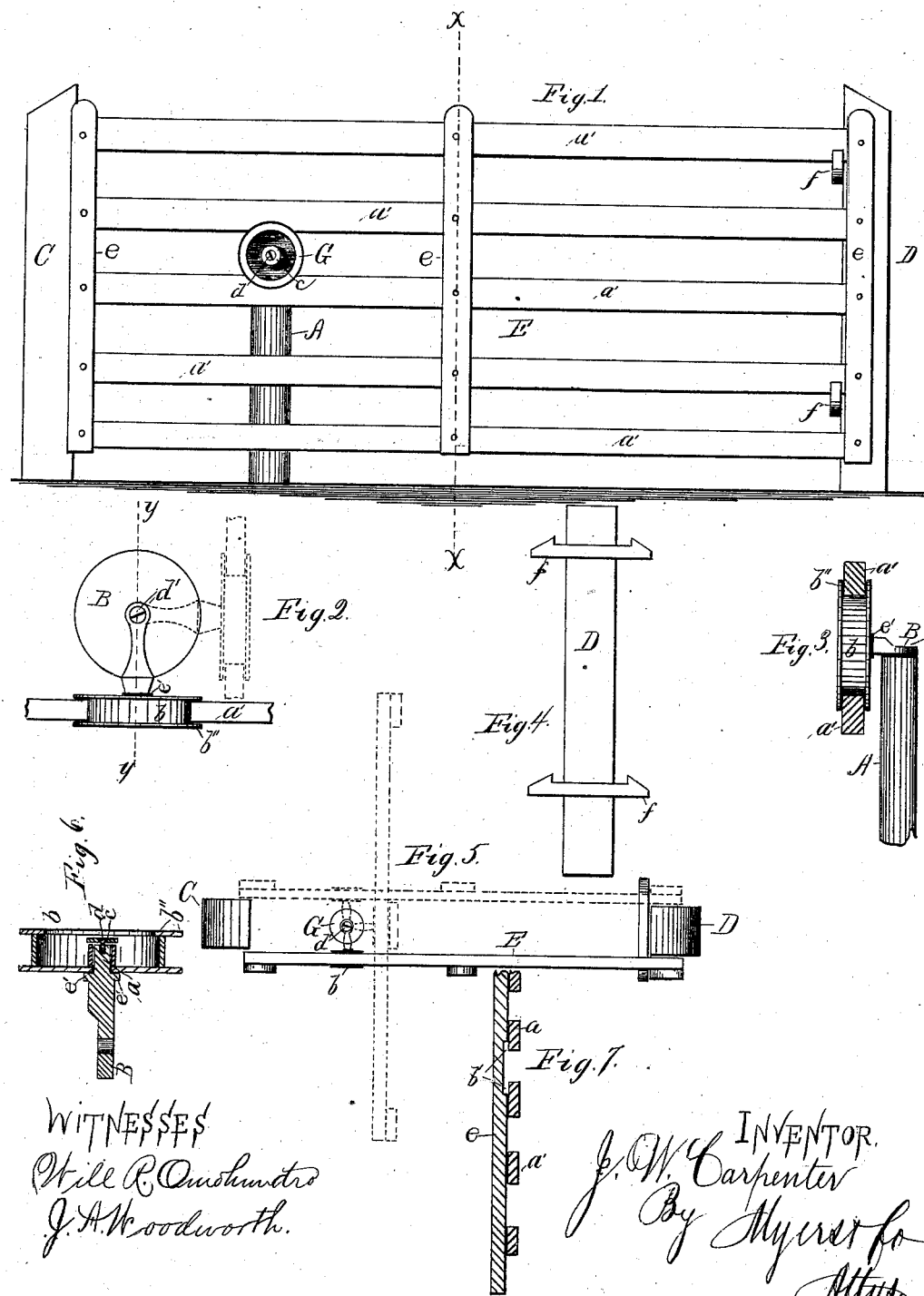

UNITED STATES PATENT OFFICE.

JOHN W. CARPENTER, OF BRIDGEWATER, VIRGINIA.

GATE.

SPECIFICATION forming part of Letters Patent No. 239,365, dated March 29, 1881.

Application filed September 28, 1880. (No model.)

*To all whom it may concern:*

Be it known that I, JOHN W. CARPENTER, a citizen of the United States, residing at Bridgewater, in the county of Rockingham and State of Virginia, have invented certain new and useful Improvements in Gates; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in gates; and it consists in the post A, having attached horizontally thereto the pivoted disk B, the axle $a$, and flanged wheel $b$, washer $c$, screw $d$, recessed uprights $e\ e$, the posts C and D, the catches $f\!f$, and in the combination and arrangement of the parts as hereinafter more specifically described.

In the drawings, Figure 1 is an elevation of my improved gate. Fig. 2 is a detached plan view of my hinge G. Fig. 3 is a side elevation thereof. Fig. 4 is a detached view of post D, showing position of catches. Fig. 5 is a plan view of my improved gate, the dotted lines representing the various positions it assumes in practice. Fig. 6 is a sectional view on line $y\ y$ of Fig. 2; and Fig. 7 is a similar view on line $x\ x$ of Fig. 1, showing recess in upright $e$.

E represents a gate composed of longitudinal rails $a'$ and the uprights $e$. These uprights are recessed at $b'$, as shown in Fig. 7, to admit the flange $b''$ of the flanged wheel, which flange projects partly across the rails, and thus secures the gate upon the periphery of the wheel $b$.

B represents a metallic disk, supported by the post A, and provided with an orifice in the center for reception of the bolt $d'$, whereon it rotates freely, the bolt being driven vertically into the post. This disk has cast solid therewith the axle $a$, having the shoulder $e'$, whereon rotates the flanged wheel $b$. This axle has provided therein longitudinally a female screw-thread for reception of the male screw $d$. The flanged wheel is secured by the washer $c$, which projects across the orifice in the hub of the wheel; but the washer may be dispensed with by making the diameter of the screw-head greater than that of the wheel-hub.

The letter G represents a metallic hinge, which comprises the flanged wheel $b$ and its metallic connections. When the wheel is cast solid a recess is provided therein, in order that the head of the screw may fit flush on the same plane as the side of the wheel. The gate E is placed upon the periphery of the wheel, and the flange $b''$ of the wheel $b$, in attaching it to the gate, is first projected into the recess (shown in Fig. 7) of one of the end uprights, $e\ e$. This construction admits the gate being run forward or backward on the wheel, the hinge being pivoted to the post A, which supports the weight thereof.

D represents a post having catches $f\!f$ rigidly secured thereto, which latter are designed for reception of the panels of the gate, which, when placed thereon, securely close the gate.

In opening the gate for admission of a vehicle it is lifted out of said catches and pushed back on the wheel until a balance is obtained, and then rotated into a line parallel with the road, as shown by dotted lines, Fig. 5; and when the vehicle has passed the gate may be closed on either side of the posts or either end of the gate may be hung to the catches. Hence the gate may always be opened in the direction traveled, whether leading out of or into the inclosure.

What I claim is—

The gate E, in combination with post A, disk B, pivoted to the top of said post, provided with axle $a$, wheel $b$, and screw $d$, substantially as set forth.

In testimony whereof I affix my signature in presence of two witnesses.

J. W. CARPENTER.

Witnesses:
T. H. B. BROWN,
S. S. MILLER.